United States Patent [19]

Braun

[11] 4,424,008
[45] Jan. 3, 1984

[54] HERMETIC SEAL FOR COMPRESSORS OR THE LIKE

[76] Inventor: Anton Braun, 6421 Warren Ave., Minneapolis, Minn. 55435

[21] Appl. No.: 392,457

[22] Filed: Jun. 28, 1982

Related U.S. Application Data

[63] Continuation of Ser. No. 174,201, Jul. 31, 1980, abandoned.

[51] Int. Cl.$^3$ .............................................. F04B 39/04
[52] U.S. Cl. .................................... 417/364; 74/18.2; 92/41; 417/375
[58] Field of Search ...................... 92/39, 41; 74/18.2, 74/110; 417/364, 473

[56] References Cited

U.S. PATENT DOCUMENTS

| | | | |
|---|---|---|---|
| 1,740,924 | 12/1929 | Kellogg | 417/397 |
| 2,839,241 | 6/1958 | Kurtz | 74/18.2 X |
| 3,216,651 | 11/1965 | King et al. | 417/364 |
| 3,745,868 | 7/1973 | Prentice | 74/110 X |
| 3,875,806 | 4/1975 | Brewster | 74/18.2 |

FOREIGN PATENT DOCUMENTS 109130 3/1900 Fed. Rep. of Germany .

*Primary Examiner*—Leonard E. Smith
*Attorney, Agent, or Firm*—Alan M. Staubly

[57] ABSTRACT

A hermetic seal, primarily for compressors for use in refrigeration or air conditioning systems but having use in apparatus wherein a seal is required between two elements reciprocating substantial distances relative to each other, comprising a bellows having a plurality of sections of convolutions with positive displacement means associated therewith that assures simultaneous movement of most of the convolutions upon rapid acceleration of relative movement between the two elements. This prevents excess stress and strain on any one or more convolutions, or on the end convolutions in particular, that could cause failure thereof by distributing the stress over a large number of the convolutions rather than just a few at any one instant. The stress in each convolution of the bellows depends upon the natural frequency and spring rates of any given bellows diameter and number of convolutions. Also, the stresses in the various convolutions depends upon the location of and the number of sections that have positive displacement means for actuation thereof, (engine) speed and piston acceleration. By proper selection of the number of convolutions in each section, which should decrease in numbers sequentially from a fixed end thereof to a movable end thereof, it is possible to make a bellows of substantial length wherein the maximum stress level in each bellows section will be substantially equal.

10 Claims, 1 Drawing Figure

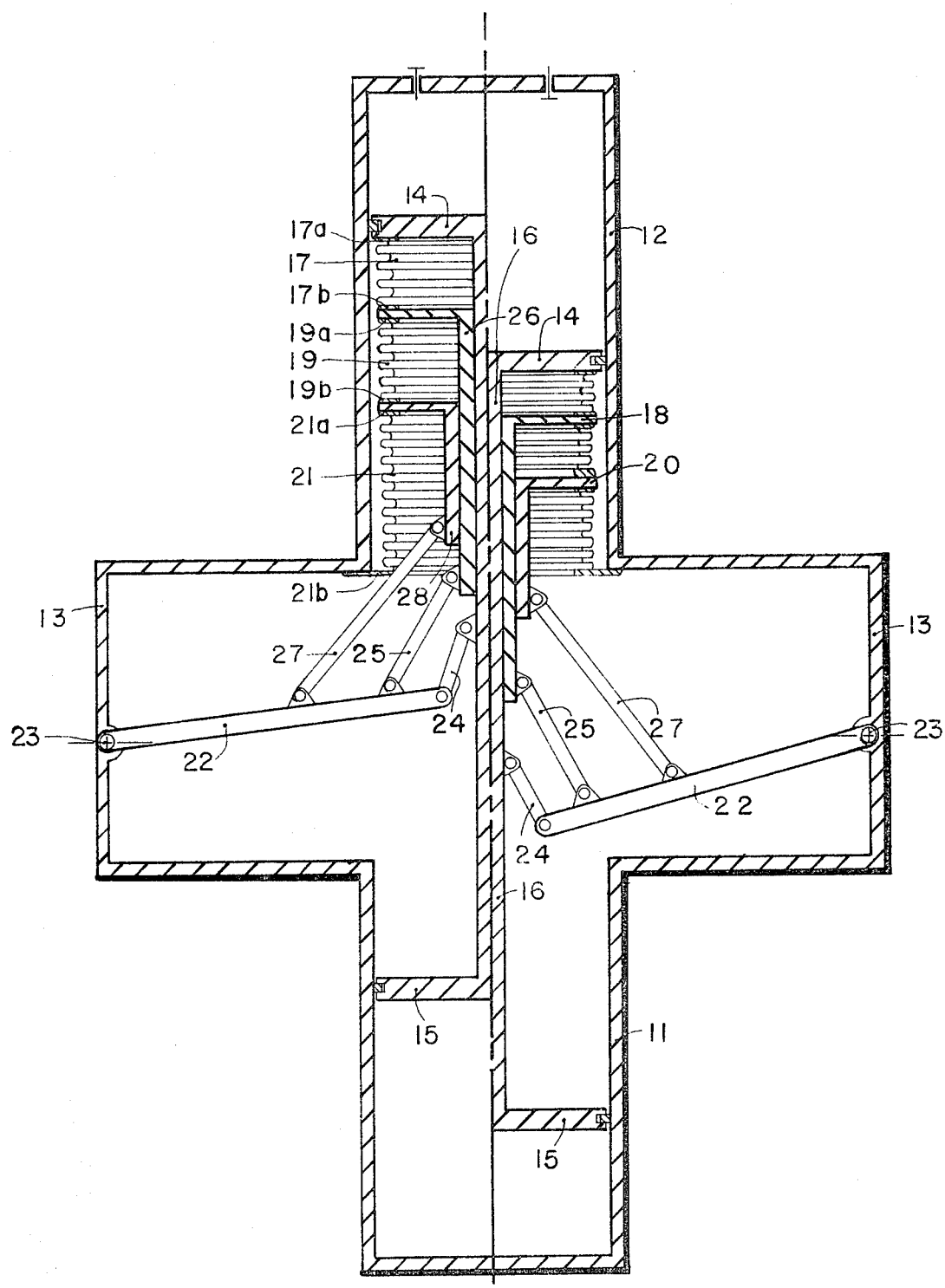

HERMETIC SEAL FOR COMPRESSORS OR THE LIKE

This application is a continuation of my co-pending application, Ser. No. 06/174,201 and filed July 31, 1980, now abandoned.

The invention relates to hermetic seals for compressors and or the like, more particularly, for compressors for refrigeration or air conditioning systems. In such systems, a major problem has been in providing a suitable seal between the refrigerant in the compressor and the power unit for driving the refrigerant compressor piston. The use of a bellows having the closed end thereof welded or otherwise fixedly connected to a piston rod or lever, for operating a compressor piston in a cylinder, and its other end welded or otherwise fixedly connected to the open end of a cylinder, to provide a hermetic seal between the compression chamber of the cylinder and the exterior of the cylinder, is broadly old in the art. However, when long bellows are used in internal combustion engine driven piston types of compressors having long strokes, the bellows convolution nearest the piston suffers much more strain and flexing than the other convolutions. Normally, the maximum strain in each convolution decreases progressively from the piston end to the cylinder end. This is due to the fact that the accelerations of the power and compressor pistons are the greatest at the point of stroke reversal of the pistons, and due to the mass of the numerous convolutions, they each lag behind the preceeding convolution in responding to the movement of the pistons. These facts explain why bellows seals have been failing by the end convolution either tearing away from the piston or the walls thereof cracking. However, should beat frequencies occur, on occasions, the maximum stress and strain could occur in most any convolution. Even in such occasions, this invention keeps the maximum stress and strain very low so as to protect against damage.

The present invention overcomes the above problem by providing means in association with a bellows or series of bellows that forces the intermediate and/or remote convolutions to immediately move with the convolutions nearest the ends of the bellows. In this way the stress exerted by the piston on the bellows is spread more evenly over all of the convolutions simultaneously and continuously. This avoids excessive strain on the first few convolutions from the bellows' ends and thereby increases the life of the bellows.

The only FIGURE of the drawing is a schematic showing of one embodiment of the invention.

The preferred embodiment of the compressor is illustrated as having a conventional power cylinder 11, a conventional compression cylinder 12 and a connecting housing 13. A compressor piston 14 is connected to a power piston 15 by a piston rod 16. A first bellows 17 has an inwardly extending flange 17a sealingly connected to piston 14 and a second flange 17b connected to washer 18. A second bellows 19 has inwardly extending flanges 19a and 19b sealingly connected to washer 18 and a second washer 20, respectively. A third bellows 21 has an inwardly extending flange 21a and an outwardly extending flange 21b sealingly connected to washer 20 and the open end of cylinder 12, respectively.

A pair of main or control levers 22 are pivotally connected to opposite walls of housing 13 at 23 and are pivotally connected at their inner ends to piston rod 16 through a first pair of links 24. Second links 25 are pivotally connected to levers 22 at a point intermediate to the length of lever 22 and to the adjacent end of a tube 26 extending from washer 18 to a position above links 24. A third pair of links 27 are pivotally connected to levers 22 at a point between said links 25 and said pivots 23 and to the adjacent end of a tube 28 extending from washer 20 to a position above links 25.

The right half of the drawing shows the elements of the compressor in the positions they assume when the compressor piston is at the end of its suction stroke and the power piston is at the end of its compression stroke. Upon ignition of fuel in the cylinder 11, piston 14 will start to stretch bellows 17; washer 18 will raise the lower convolutions of bellows 17 and start to stretch bellows 19; and washer 20 will raise the lower convolutions of bellows 19 and start to stretch bellows 21.

Since the acceleration of the pistons decreases with the distance traveled, the stress on convolutions of bellows 21 will be minimal and the stress on the convolutions of bellows 17, and on the convolution next to the piston 14 in particular, is also minimal when compared to what it would have been if no levers were provided to aid in the lifting of the lower convolutions of bellows 17 and all of bellows 19 and 21.

In moving from the positions of the elements as illustrated in the right half of the drawing, at the end of the power and compression strokes of pistons 15 and 14, respectively, the convolutions of bellows 17 would be badly flattened if it were not for the lowering of the lower convolutions of 17 and all of those of bellows 19 and 21. Also, due to the movement of tube 28 and washer 20, the stress on the lower convolution and its connection with the cylinder is kept within a safe amount.

It is deemed apparent that two bellows, with a selected or desired speed lever arrangement, or four or more bellows, with corresponding lever arrangements, could be used where different stroke lengths are involved. Also, other types of levers and pivotal arrangements may be used without departing from the scope of this invention. It is even possible to use hydraulic means to provide the functions performed by the illustrated lever arrangement. This would involve the use of a stepped cylinder with two or more steps with different diameter pistons connected to one or more intermediate convolutions of the bellows, to provide different speeds and travel lengths for the various convolutions, to produce the same functioning as in the lever arrangement.

It is to be noted in the illustrated preferred embodiment of the invention that not only does the number of convolutions in each individually actuated section of the bellows seal diminish sequentially from the fixed end of the bellows toward the movable end thereof, the mechanism for actuating each section is also arranged so that the displacement between the first and last convolution of each individually actuated bellows section, with respect to each other, also diminishes sequentially from the fixed end of the bellows toward the movable end thereof.

Since the spring rates, natural frequency for given bellows sizes and number of bellows convolutions, acceleration rates and speeds are factors to be considered in the number and locations of the lever or other types of connections to the bellows, computation or experimentation may be used to determine the locations of the connections to give substantially equal stress levels in the bellows convolutions.

I claim:

1. A hermetic seal for a compressor or the like having a cylinder with a reciprocable rod therein and power means for moving said rod back and forth a substantial distance along the axis of said cylinder, comprising a bellows surrounding said rod and extending between said rod and said cylinder, said bellows having a plurality of convolutions with one end of the bellows being sealingly connected to said rod and the other end of said bellows being sealingly connected to the periphery of the cylinder, and symmetrical motion transmitting means around said rod and extending between said rod and one or more intermediate portions of said bellows that will positively cause said intermediate portion or portions of said bellows to move when said one end of the bellows moves but at a slower speed or speeds and to a lesser distance from said other end of said bellows, said intermediate portions of said bellows dividing said bellows into two or more bellows sections wherein the relative displacement between the first and the last convolution of each of said bellows section are unequal.

2. A hermetic seal as defined in claim 1, wherein the relative displacement between the first and the last convolution of each of said bellows sections sequentially decreases from the bellows connection to the cylinder to the bellows connection to said rod.

3. A hermetic seal for a compressor or the like having a cylinder with a reciprocable rod therein and power means for moving said rod back and forth a substantial distance along the axis of said cylinder, comprising a bellows surrounding said rod and extending between said rod and said cylinder, said bellows having a plurality of convolutions with one end of the bellows being sealingly connected to said rod and the other end of said bellows being sealingly connected to the periphery of the cylinder, and symmetrical motion transmitting means around said rod and extending between said rod and one or more intermediate portions of said bellows that will positively cause said intermediate portion or portions of said bellows to move when said one end of the bellows moves but at a slower speed or speeds and to a lesser distance from said other end of said bellows, said intermediate portions of said bellows dividing said bellows into two or more bellows sections wherein the number of convolutions in each section are unequal.

4. A hermetic seal as defined in claim 3, wherein the number of convolutions in each section sequentially decreases from the bellows connection to said cylinder to the bellows connection to said rod.

5. A hermetic seal as defined in claim 3, wherein said motion transmitting means includes a main lever pivoted on a fixed pivot at one of its ends and pivotally connected to said rod at its other end and a link or links pivotally connected to an intermediate portion or portions of said bellows and to said main lever at a point or points intermediate to its ends.

6. A hermetic seal as defined in claim 5, wherein said link or links is or are pivotally connected to a tube or tubes that surround said rod and the tube or tubes are connected to said intermediate portion or portions of said bellows.

7. A hermetic seal as defined in claim 3, in combination with a compressor piston connected to said rod and power means for actuating said rod.

8. The combination defined in claim 3, wherein said one end of said bellows is connected to said rod by being connected to the periphery of a compressor piston which in turn is connected to said rod.

9. A hermetic seal as defined in claim 3, wherein the convolution of maximum stress level on each side of said intermediate portion or portions have substantially equal stress levels.

10. A hermetic seal as defined in claim 3, wherein said symmetrical motion transmitting means includes a tube or tubes extending around said rod and axially from said intermediate portion or portions.

* * * * *